US010686829B2

(12) United States Patent
Amit et al.

(10) Patent No.: US 10,686,829 B2
(45) Date of Patent: Jun. 16, 2020

(54) IDENTIFYING CHANGES IN USE OF USER CREDENTIALS

(71) Applicant: Palo Alto Networks (Israel Analytics) Ltd, Tel Aviv (IL)

(72) Inventors: Idan Amit, Ramat Gan (IL); Eyal Firstenberg, Ramat HaSharon (IL); Jonathan Allon, Haifa (IL); Yaron Neuman, Zoran (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 277 days.

(21) Appl. No.: 15/694,891

(22) Filed: Sep. 4, 2017

(65) Prior Publication Data

US 2018/0069893 A1  Mar. 8, 2018

Related U.S. Application Data

(60) Provisional application No. 62/383,518, filed on Sep. 5, 2016.

(51) Int. Cl.
*G06F 11/00* (2006.01)
*H04L 29/06* (2006.01)
(Continued)

(52) U.S. Cl.
CPC ........ *H04L 63/1441* (2013.01); *G06F 21/552* (2013.01); *G06F 21/554* (2013.01);
(Continued)

(58) Field of Classification Search
CPC ............. H04L 63/0245; H04L 63/1416; H04L 63/1441; H04L 63/1425
(Continued)

(56) References Cited

U.S. PATENT DOCUMENTS 5,991,881 A    11/1999  Conklin et al.
6,347,374 B1    2/2002  Drake et al.
(Continued)

FOREIGN PATENT DOCUMENTS

EP    0952521 A2    10/1999
EP    2056559 A1     5/2009

OTHER PUBLICATIONS

U.S. Appl. No. 14/726,539 office action dated Feb. 23, 2018.
(Continued)

*Primary Examiner* — Gary S Gracia
(74) *Attorney, Agent, or Firm* — Kligler & Associates Patent Attorneys Ltd (57) ABSTRACT

A method including extracting, from initial data transmitted on a network, multiple events, each of the events including a user accessing a resource. First and second sets of records are created, each first set record including a sub-group of the events of a user, each second set record including a sub-group of the events of a multiple users during respective sub-periods of a training period. Safe labels are assigned to the first set records and suspicious labels are assigned to the second set records. An analysis fits, to the first and the second set records and their respective labels, a model for predicting the label for a given record. The model filters subsequent network data to identify, in the subsequent data, sequences of events predicted to be labeled suspicious by the model, and upon detecting a given sequence of events predicted as suspicious by the model, an alert is generated.

12 Claims, 5 Drawing Sheets

(51) Int. Cl.
*G06N 5/04* (2006.01)
*G06N 20/00* (2019.01)
*G06F 21/55* (2013.01)
*G06F 12/14* (2006.01)

(52) U.S. Cl.
CPC ............... *G06N 5/04* (2013.01); *G06N 20/00* (2019.01); *H04L 63/0245* (2013.01); *H04L 63/1416* (2013.01); *H04L 63/1425* (2013.01)

(58) Field of Classification Search
USPC .......................... 726/23; 713/194; 706/12, 58
See application file for complete search history.

(56) References Cited

U.S. PATENT DOCUMENTS

| | | | |
|---|---|---|---|
| 7,178,164 B1 | 2/2007 | Bonnes | |
| 7,225,343 B1* | 5/2007 | Honig | G06F 21/554 713/194 |
| 7,694,150 B1 | 4/2010 | Kirby | |
| 7,703,138 B2 | 4/2010 | Desai et al. | |
| 7,752,665 B1 | 7/2010 | Robertson et al. | |
| 8,429,180 B1 | 4/2013 | Sobel et al. | |
| 8,490,190 B1 | 7/2013 | Hernacki et al. | |
| 8,555,388 B1 | 10/2013 | Wang et al. | |
| 8,677,487 B2 | 3/2014 | Balupari et al. | |
| 8,925,095 B2 | 12/2014 | Herz et al. | |
| 8,966,625 B1 | 2/2015 | Zuk et al. | |
| 9,038,178 B1 | 5/2015 | Lin | |
| 9,147,071 B2 | 9/2015 | Sallam | |
| 9,342,691 B2 | 5/2016 | Maestas | |
| 9,378,361 B1 | 6/2016 | Yen et al. | |
| 9,386,028 B2 | 7/2016 | Altman | |
| 9,753,968 B1* | 9/2017 | Ronen | G06F 16/215 |
| 2003/0110396 A1 | 6/2003 | Lewis et al. | |
| 2004/0117658 A1 | 6/2004 | Klaes | |
| 2004/0210769 A1 | 10/2004 | Radatti et al. | |
| 2004/0250169 A1 | 12/2004 | Takemori et al. | |
| 2004/0260733 A1 | 12/2004 | Adelstein et al. | |
| 2005/0262560 A1 | 11/2005 | Gassoway | |
| 2005/0268112 A1 | 12/2005 | Wang et al. | |
| 2006/0018466 A1 | 1/2006 | Adelstein et al. | |
| 2006/0075462 A1 | 4/2006 | Golan | |
| 2006/0075492 A1 | 4/2006 | Golan et al. | |
| 2006/0075500 A1 | 4/2006 | Bertman et al. | |
| 2006/0136720 A1 | 6/2006 | Armstrong et al. | |
| 2006/0149848 A1 | 7/2006 | Shay | |
| 2006/0161984 A1 | 7/2006 | Phillips et al. | |
| 2006/0191010 A1 | 8/2006 | Benjamin | |
| 2006/0282893 A1 | 12/2006 | Wu et al. | |
| 2007/0072661 A1 | 3/2007 | Lototski | |
| 2007/0214088 A1 | 9/2007 | Graham et al. | |
| 2007/0218874 A1 | 9/2007 | Sinha et al. | |
| 2007/0226796 A1 | 9/2007 | Gilbert et al. | |
| 2007/0283166 A1 | 12/2007 | Yami et al. | |
| 2008/0005782 A1 | 1/2008 | Aziz | |
| 2008/0016339 A1 | 1/2008 | Shukla | |
| 2008/0016570 A1 | 1/2008 | Capalik | |
| 2008/0104046 A1 | 5/2008 | Singla et al. | |
| 2008/0104703 A1 | 5/2008 | Rihn et al. | |
| 2008/0134296 A1 | 6/2008 | Amitai et al. | |
| 2008/0198005 A1 | 8/2008 | Schulak et al. | |
| 2008/0271143 A1 | 10/2008 | Stephens et al. | |
| 2009/0007100 A1 | 1/2009 | Field et al. | |
| 2009/0007220 A1 | 1/2009 | Ormazabal et al. | |
| 2009/0157574 A1 | 6/2009 | Lee | |
| 2009/0182701 A1* | 7/2009 | Berger | G06F 21/552 706/58 |
| 2009/0320136 A1 | 12/2009 | Lambert et al. | |
| 2010/0107257 A1 | 4/2010 | Ollmann | |
| 2010/0162400 A1 | 6/2010 | Feeney et al. | |
| 2010/0197318 A1 | 8/2010 | Petersen et al. | |
| 2010/0212013 A1 | 8/2010 | Kim et al. | |
| 2010/0217861 A1 | 8/2010 | Wu | |
| 2010/0268818 A1 | 10/2010 | Richmond et al. | |
| 2010/0278054 A1 | 11/2010 | Dighe | |
| 2010/0299430 A1 | 11/2010 | Powers et al. | |
| 2011/0153748 A1 | 6/2011 | Lee et al. | |
| 2011/0185421 A1 | 7/2011 | Wittenstein et al. | |
| 2011/0214187 A1 | 9/2011 | Wittenstein et al. | |
| 2011/0225650 A1 | 9/2011 | Margolies et al. | |
| 2011/0247071 A1 | 10/2011 | Hooks et al. | |
| 2011/0265011 A1 | 10/2011 | Taylor et al. | |
| 2011/0270957 A1 | 11/2011 | Phan et al. | |
| 2011/0302653 A1 | 12/2011 | Frantz et al. | |
| 2011/0321175 A1 | 12/2011 | Slater | |
| 2012/0079596 A1 | 3/2012 | Thomas et al. | |
| 2012/0102359 A1 | 4/2012 | Hooks | |
| 2012/0136802 A1 | 5/2012 | McQuade et al. | |
| 2012/0137342 A1 | 5/2012 | Hartrell et al. | |
| 2012/0143650 A1 | 6/2012 | Crowley et al. | |
| 2012/0191660 A1 | 7/2012 | Hoog | |
| 2012/0222120 A1 | 8/2012 | Rim et al. | |
| 2012/0233311 A1 | 9/2012 | Parker et al. | |
| 2012/0275505 A1 | 11/2012 | Tzannes et al. | |
| 2012/0331553 A1 | 12/2012 | Aziz et al. | |
| 2013/0097103 A1* | 4/2013 | Chari | G06N 20/00 706/12 |
| 2013/0097706 A1 | 4/2013 | Titonis et al. | |
| 2013/0111211 A1 | 5/2013 | Winslow et al. | |
| 2013/0196549 A1 | 8/2013 | Sorani | |
| 2013/0298243 A1 | 11/2013 | Kumar et al. | |
| 2014/0165207 A1 | 6/2014 | Engel et al. | |
| 2014/0196115 A1 | 7/2014 | Pelykh | |
| 2014/0325643 A1 | 10/2014 | Bart et al. | |
| 2015/0040219 A1 | 2/2015 | Garraway et al. | |
| 2015/0047032 A1 | 2/2015 | Hannis et al. | |
| 2015/0121461 A1 | 4/2015 | Dulkin et al. | |
| 2015/0195300 A1 | 7/2015 | Adjaoute | |
| 2015/0200821 A1 | 7/2015 | Sade et al. | |
| 2015/0264069 A1 | 9/2015 | Beauchesne et al. | |
| 2015/0286819 A1* | 10/2015 | Coden | G06F 21/552 726/23 |
| 2015/0304346 A1 | 10/2015 | Kim | |
| 2015/0319185 A1* | 11/2015 | Kirti | H04L 63/1416 726/23 |
| 2015/0358344 A1 | 12/2015 | Mumcuoglu et al. | |
| 2015/0373039 A1* | 12/2015 | Wang | H04L 63/1425 726/23 |
| 2016/0191918 A1 | 6/2016 | Lai et al. | |
| 2016/0306965 A1 | 10/2016 | Iyer et al. | |
| 2016/0315954 A1 | 10/2016 | Pereson et al. | |
| 2017/0026391 A1* | 1/2017 | Abu-Nimeh | G06F 16/285 |
| 2017/0054744 A1 | 2/2017 | Mumcuoglu et al. | |

OTHER PUBLICATIONS

Niksun, "Network Intrusion Forensic System (NIFS) for Intrusion Detection and Advanced Post Incident Forensics", Whitepaper, 12 pages, Feb. 15, 2010.
Tier-3 Pty Ltd, "Huntsman Protector 360", Brochure, 2 pages, Apr. 1, 2010.
Tier-3 Pty Ltd, "Huntsman 5.7 The Power of 2", Brochure, 2 pages, Oct. 8, 2012.
Light Cyber Ltd, "LightCyber Magna", 3 pages, year 2011.
Shulman et al., "Top Ten Database Security Threats How to Mitigate the most Significant Data base Vulnerabilities", White paper, Impevra Inc, pp. 1-14, 2006.
U.S. Appl. No. 14/726,539 office action dated Oct. 5, 2017.
Bilge et al., "Disclosure: Detecting Botnet Command and Control Servers Through Large-Scale NetFlow Analysis", ACSAC, 10 Pages, Dec. 3-7, 2012.
BLUM., "Combining Labeled and Unlabeled Data with Co-Training", Carnegie Mellon University, Research Showcase @ CMU, Computer Science Department, 11 pages, Jul. 1998.
Felegyhazi et al., "On the Potential of Proactive Domain Blacklisting", LEET'10 Proceedings of the 3rd USENIX Conference on Large-scale exploits and emergent threats, 8 pages, San Jose, USA, Apr. 27, 2010.
Frosch., "Mining DNS-related Data for Suspicious Features", Ruhr Universitat Bochum, Master'sThesis, 88 pages, Dec. 23, 2011.

(56) References Cited

OTHER PUBLICATIONS

Bilge at al., "EXPOSURE: Finding Malicious Domains Using Passive DNS Analysis", NDSS Symposium, 17 pages, Feb. 6, 2009, 2011.

Gross et al., "FIRE: Finding Rogue nEtworks", Annual Conference on Computer Security Applications (ACSAC'09), 10 pages, Dec. 7-11, 2009.

Markowitz, N., "Bullet Proof Hosting: A Theoretical Model", Security Week, 5 pages, Jun. 29, 2010, downloaded from http://www.infosecisland.com/blogview/4487-Bullet-Proof-Hosting-A-Theoretical-Model.html.

Konte et al., "ASwatch: An AS Reputation System to Expose Bulletproof Hosting ASes", SIGCOMM , pp. 625-638, Aug. 17-21, 2015.

Markowitz, N., "Patterns of Use and Abuse with IP Addresses", Security Week, 4 pages, Jul. 10, 2010, downloaded from http://infosecisland.com/blogview/5068-Patterns-of-Use-and-Abuse-with-IP-Addresses.html.

Wei et al., "Identifying New Spam Domains by Hosting IPs: Improving Domain Blacklisting", Department of Computer and Information Sciences, University of Alabama at Birmingham, USA, 8 pages, Dec. 8, 2010.

Goncharov,M., "Criminal Hideouts for Lease: Bulletproof Hosting Services", Forward-Looking Threat Research (FTR) Team, A TrendLabsSM Research Paper, 28 pages, Jul. 3, 2015.

\* cited by examiner

IDENTIFYING CHANGES IN USE OF USER CREDENTIALS

CROSS-REFERENCE TO RELATED APPLICATIONS

This application claims the benefit of U.S. Provisional Patent Application 62/383,518, filed Sep. 5, 2016, which is incorporated herein by reference.

FIELD OF THE INVENTION

The present invention relates generally to computer systems and networks, and particularly to apparatus, method and software for detecting changes in use of a user's credentials.

BACKGROUND OF THE INVENTION

In many computer and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to prevent malware from spreading through the network.

In this latter category, for example, U.S. Patent Application 2014/0165207 to Engel et al. describes a method and system for detecting anomalous action within a computer network. The method starts with collecting raw data from at least one probe sensor that is associated with at least one router, switch or server in the computer network. The raw data is parsed and analyzed to create meta-data from the raw data, and computer network actions are identified based on knowledge of network protocols. The meta-data or a higher level aggregation is associated with entities by analyzing and correlating between the identified network actions. A statistical model of the computer network is created, for detection of anomalous network actions associated with the entities.

As another example, U.S. Patent Application 2015/0358344 to Mumcuoglu et al. describes a method for computer system forensics that includes receiving an identification of at least one host computer that has exhibited an anomalous behavior, in a computer network comprising multiple host computers. Respective images of the host computers in the network are assembled using image information collected with regard to the host computers. A comparison is made between at least one positive image of the at least one host computer, assembled using the image information collected following occurrence of the anomalous behavior, and one or more negative images assembled using the image information collected with respect to one or more of the host computers not exhibiting the anomalous behavior. Based on the comparison, a forensic indicator of the anomalous behavior is extracted from the positive and negative images.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including extracting, from initial data transmitted on a data network including a set of resources accessed by a set of training users, a plurality of events, each of the events including a given training user accessing a given resource, creating first and second sets of records, each given record in the first set including a sub-group of the extracted events of a single training user, each given record in the second set including a sub-group of the events of a plurality of the training users during respective sub-periods of a training period, assigning safe labels to the records in the first set and suspicious labels to the records in the second set, performing, by a processor, an analysis to fit, to the records in the first and the second sets and their respective labels, a model for predicting the label for a given record, filtering, using the model, subsequent data transmitted on the data network to identify, in the subsequent data, sequences of events predicted to be labeled suspicious by the model, and upon detecting a given sequence of events predicted as suspicious by the model, generating an alert.

In some embodiments, filtering the subsequent data includes extracting, from the data transmitted on the data network between a set of resources accessed by a set of production users, a plurality of additional events, and creating respective sequences of the additional events for the production users, and wherein using the model includes applying the model to the sequences of the additional events.

In one embodiment, the analysis includes a machine learning algorithm. In another embodiment, a given event includes a given training user accessing a given resource. In additional embodiments, a given resource includes a server.

In further embodiments, the data network includes a workstation including a log, wherein a given training user is logged into the workstation, wherein the log includes actions performed by the resource for a given training user, and wherein the data includes the log. In supplemental embodiments, the data network includes a workstation, wherein a given training user is logged into the workstation, and where in the extracted data includes data packets transmitted between the workstation and the resources. In some embodiments, the plurality of the training users include two training users, and wherein the respective sub-periods include two non-overlapping time periods within the training period.

There is also provided, in accordance with an embodiment of the present invention, an apparatus, including a memory, and a processor configured to extract, from initial data transmitted on a data network including a set of resources accessed by a set of training users, a plurality of events, each of the events including a given training user accessing a given resource, to create, in the memory, first and second sets of records, each given record in the first set including a sub-group of the extracted events of a single training user, each given record in the second set including a sub-group of the events of a plurality of the training users during respective sub-periods of a training period, to assign safe labels to the records in the first set and suspicious labels to the records in the second set, to perform an analysis to fit, to the records in the first and the second sets and their respective labels, a model for predicting the label for a given record, to filter, using the model, subsequent data transmitted on the data network to identify, in the subsequent data, sequences of events predicted to be labeled suspicious by the model, and upon detecting a given sequence of events predicted as suspicious by the model, to generate an alert.

There is additionally provided, in accordance with an embodiment of the present invention, a computer software product the product including a non-transitory computer-readable medium, in which program instructions are stored, which instructions, when read by a computer, cause the computer to extract, from initial data transmitted on a data network including a set of resources accessed by a set of training users, a plurality of events, each of the events including a given training user accessing a given resource, to create first and second sets of records, each given record in the first set including a sub-group of the extracted events of a single training user, each given record in the second set including a sub-group of the events of a plurality of the training users during respective sub-periods of a training period, to assign safe labels to the records in the first set and suspicious labels to the records in the second set, to perform an analysis to fit, to the records in the first and the second sets and their respective labels, a model for predicting the label for a given record, to filter, using the model, subsequent data transmitted on the data network to identify, in the subsequent data, sequences of events predicted to be labeled suspicious by the model, and upon detecting a given sequence of events predicted as suspicious by the model, to generate an alert.

BRIEF DESCRIPTION OF THE DRAWINGS

The disclosure is herein described, by way of example only, with reference to the accompanying drawings, wherein.

DETAILED DESCRIPTION OF EMBODIMENTS

Information systems such as computer networks commonly use credentials to control user privileges for accessing resources (e.g., a server or a workstation) on the network. Typically, upon successfully logging into the network using a set of credentials such as a user name and a password, a user is assigned a set of privileges enabling the user to access specific resources. For example, a user in an engineering department can be assigned privileges for accessing development servers, and a user in a marketing department can be assigned privileges for accessing customer database servers.

In order to reduce information technology (IT) department service calls and operations, users are typically assigned more privileges than they might use in typical day-to-day activities. For example, the user in the marketing department may be assigned privileges for accessing all the information stored on a given customer database server, but the user may only need privileges to specific (i.e., a subset) of directories on the server. However, if the user's credentials are compromised by an intruder, the intruder will have access to all the customer databases on the server.

Embodiments of the present invention provide methods and systems for detecting a change in use of a user's credentials that indicates that the user's credentials were compromised. In some embodiments, accesses to a set of resources (e.g., servers and workstations) on a data network by a set of training users are recorded as events during a training period, and the events are then analyzed to generate a model that can detect changes in the use of user credentials during a production period.

As described hereinbelow, multiple credential usage events are extracted from initial data transmitted on the data network, each of the events comprising a given user accessing a given resource. First and second sets of records are then created, wherein each given record in the first set comprises a sub-group of the extracted events of a single training user, and wherein each given record in the second set comprises a sub-group of the events of a plurality of the users during respective sub-periods (i.e., time periods) within the training period.

Upon creating the records, safe labels are assigned to the records in the first set and suspicious labels are assigned to the records in the second set, and an analysis can then be performed to fit, to the records in the first and the second sets and their respective labels, a model for predicting the label for a given record. Using the model, subsequent data (also referred to as production data) transmitted on the data network can be filtered in order to identify (i.e., in the subsequent data) sequences of events predicted to be labeled suspicious by the model, and upon detecting a given sequence of events predicted as suspicious by the model, an alert can be generated.

Systems implementing embodiments of the present invention can be integrated into a cybersecurity suite for protection of private networks or other computer systems. In some embodiments, the system can be typically implemented in software running on a computer, which receives and analyzes inputs from the protected network or system. While embodiments herein describe using the system for detecting change in use of a user's credentials that indicates that the user's credentials were compromised, the system may similarly be used for evaluating other aspects of user behavior in order to detect potentially malicious incursions.

One of the problems when analyzing the behavior of a new user is that there is little or no information on previous behavior. Embodiments described herein can be used to analyze a given new user by comparing the given new user's behavior comparing to the behavior of other new users.

Examples of attacks that can be detected by systems implementing embodiments of the present invention include an attacker creating a new user, and an attacker using a concurrently active user. When an attacker creates a new user, the attacker, using credentials of the new user, may then be able to access restrictive resources such as a restricted database. An example of an attacker using a concurrently active user comprises user A working in marketing, user B obtaining user A's credentials, and user B then accessing both the accounting and the marketing servers.

System Description

Figure 1:
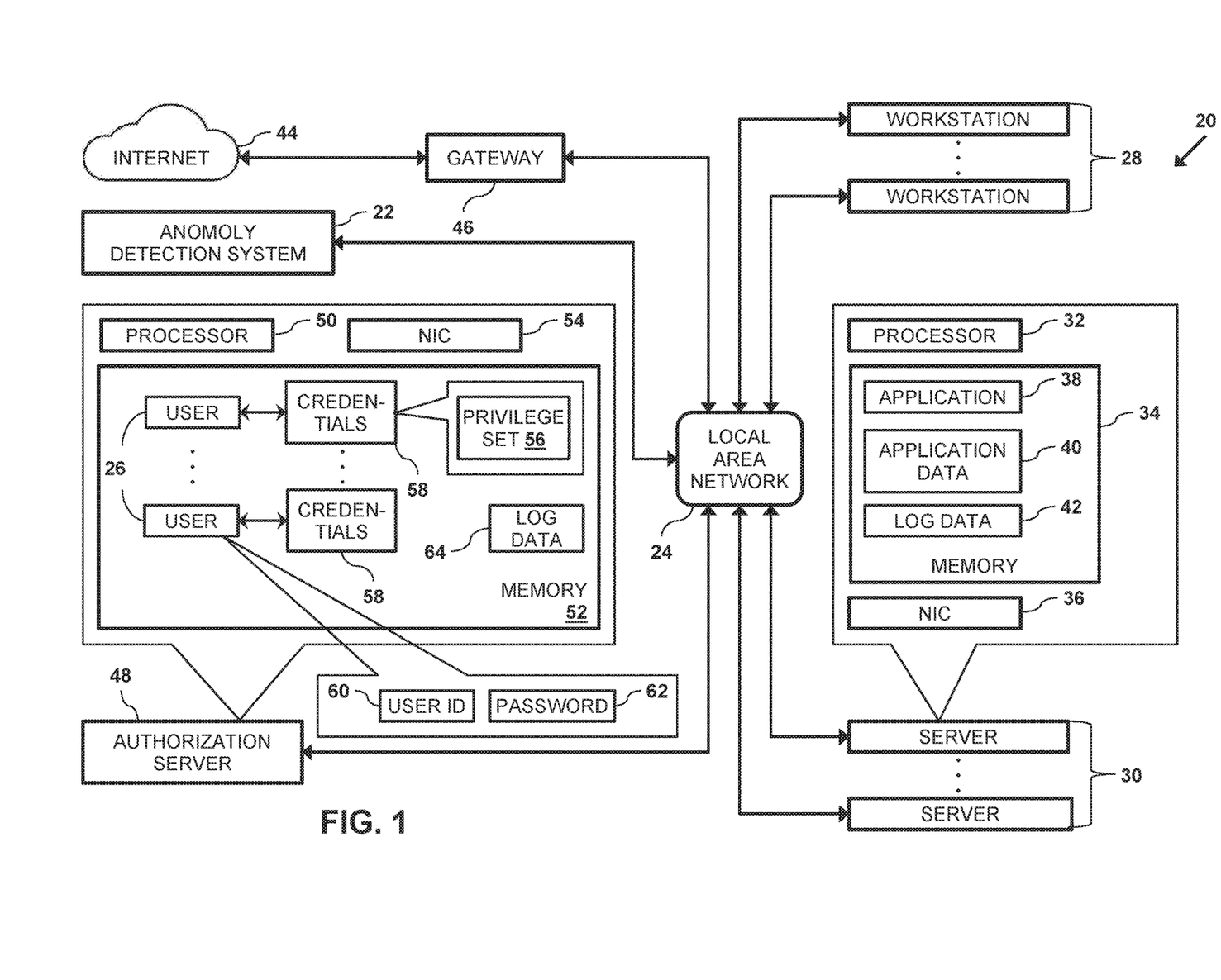
FIG. 1 is a block diagram that schematically shows a computing facility comprising an anomaly detection system that detects changes in use of user credentials, in accordance with an embodiment of the present invention.

FIG. 1 is a block diagram that schematically shows a computing facility 20 comprising an anomaly detection system 22 that monitors events on a network 24 in order to detect suspicious activity by a user based on an analysis of events associated with training users 26 (i.e., user records), in accordance with an embodiment of the present invention. Production users are described in the description referencing FIG. 2 hereinbelow.

Computing facility 20 comprises multiple workstations 28 and servers 30, which are coupled, along with anomaly detection system 22, to a network 24, such as a local area network. While the configuration in FIG. 1 shows anomaly detection system 22 and servers 30 coupled to local area network 24, configurations where the anomaly detection system and servers 30 are coupled to (and communicate over) and type of network (e.g., a wide area network or a data cloud) are considered to be within the spirit and scope of the present invention. In some embodiments, some or all of workstations 28 and servers 30 may be deployed on network 24 as virtual machines.

In embodiments described herein, workstations 28 and servers 30 may also be referred to as a resource that can be accessed by a given user 26 (or a production user, as described in the description referencing FIG. 5 hereinbelow) logged into a given workstation 28. Each given server 30 comprises a server processor 32 and a server memory 34, which are connected by a bus (not shown) to a server network interface controller (NIC) that couples the given server to network 24 (i.e., the network monitored by anomaly detection system 22). In some embodiments, each of the server processors execute, from their respective server memory a server software application 38 that manages server application data 40. For example, a given server 30 may be configured as a database server whose server processor 32 executes a database manager (i.e., software application 38) that manages a customer database (i.e., application data 40).

Typically, each server 30 maintains a server log 42 of actions performed by and on the server, such as logins, commands received and executed (e.g., for a given user 26 logged into a given workstation 28), and access to various hardware/software modules and data (e.g., files) on or via the server. Workstations 28 may maintain similar logs (which are omitted from the figure for the sake of simplicity). Typically, computing facility 20 is connected to public networks 44, such as the Internet, via a gateway 46, as is known in the art.

Computing facility 20 also includes an authorization server 48, which authenticates and authorizes the users to perform requested activities on servers 30, and to perform other operations such as administrative activities. Authorization server 48 comprises an authorization processor 50 and an authorization memory 52, which are connected by a bus (not shown) to an authorization NIC 54 that couples the authorization server to network 24. In some embodiments, authorization server may also be a source of data transmitted over the network.

In some embodiments, authorization processor 50 executes a directory service (not shown), which lists users 26 (i.e., authorized users) and their respective credentials 58 that comprise privileges 56 for computing facility 20. Examples of privileges include read access or read/write access to a given server 30 or to one or more directories (not shown) in a given server. Common directory services of this sort include, for example, the Microsoft® Active Directory service. Before performing privileged activities, workstations 28 and servers 30 must typically communicate with authorization server 48 in order to receive the necessary privileges.

In the example presented in FIG. 1, user records 26 comprise a user ID 60 and a password 62. Other examples of credentials include question/answer pairs and biometric information such as a fingerprints, facial recognition and vocal recognition. Therefore, each of the training and the production users (production users are described hereinbelow) has a corresponding user ID 60

In operation, authorization server 48 authenticates and authorizes all users and computers in computing facility 20 while enforcing security policies. Thus, when a given training user 26 uses a given user ID 60 and a given password 62 (or another authentication metric such as a fingerprint) to log into a given server 30 in computing facility 20, authorization server can check the submitted password and determine whether the given user is an administrator or a standard user. Authorization server 48 typically maintains an authorization log 64 of such activities and communications. In some embodiments, authorization server 48 may be deployed in a set of distributed servers 30 or as a set of virtual machines.

As described hereinbelow, anomaly detection system 22 receives events via network 24, and processes the events to identify a suspicious change in use of the credentials of a given training user 26. In embodiments described herein, the events may comprise the given user accessing a given server 30 in computing facility 20.

Figure 2:
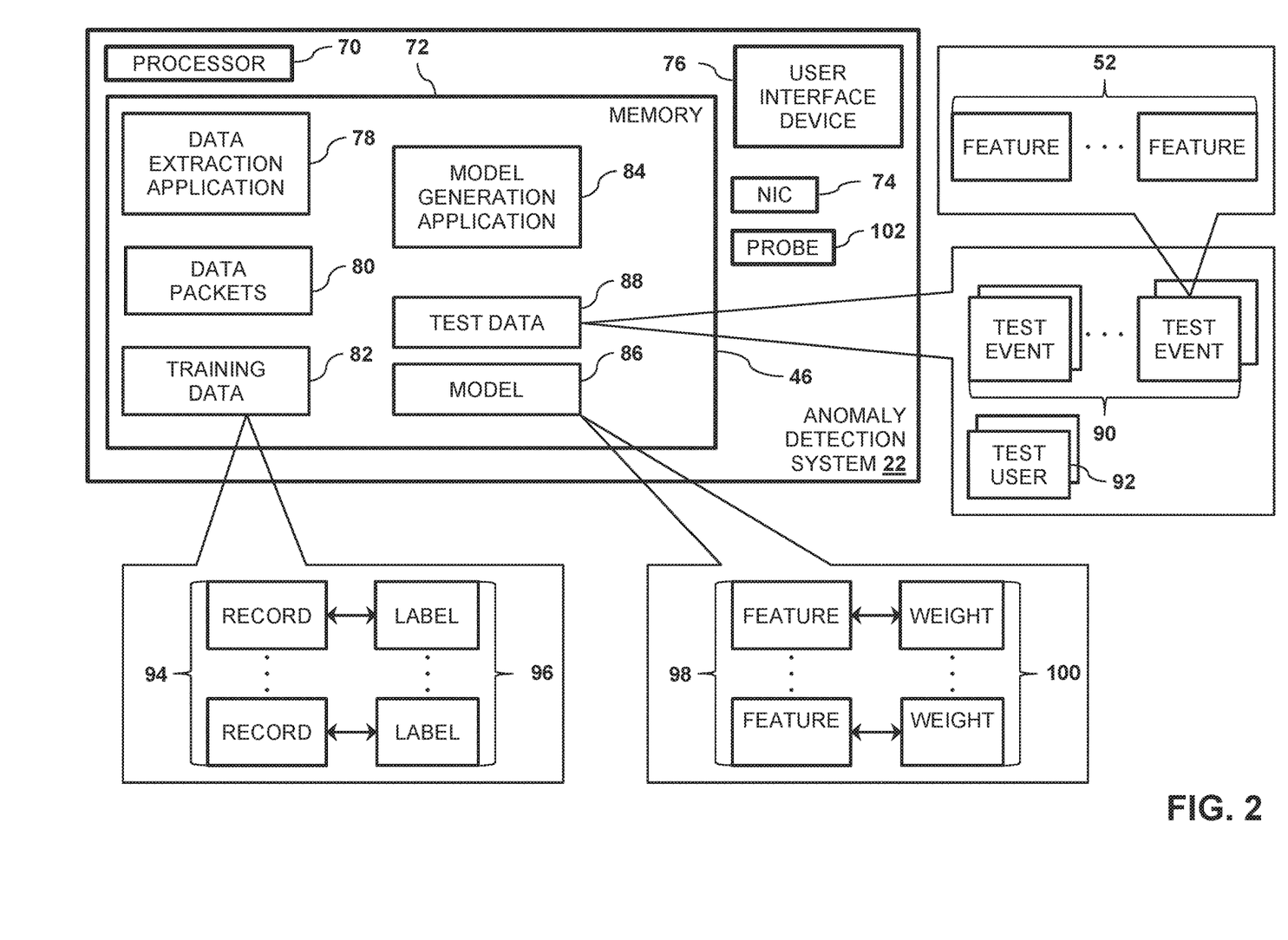
FIG. 2 is a block diagram of the anomaly detection system, in accordance with an embodiment of the present invention.

FIG. 2 is a block diagram of anomaly detection system 22, in accordance with an embodiment of the present invention. Anomaly detection system 22 comprises a system processor 70 and a system memory 72, which are connected by a bus (not shown) to a NIC 74 that couples the anomaly detection system to network 24. In some embodiments, anomaly detection system 22 may comprise a user interface device (e.g., a computer monitor) or another type of output interface. Examples of memory 72 (and memories 34 and 52) include dynamic random-access memories and non-volatile random-access memories. In some embodiments, memory 72 (and memories 34 and 52) may include non-volatile storage devices such as hard disk drives and solid-state disk drives.

Memory 72 stores a data extraction application 78, data packets 80, training data 82, a model generation application 84, a model 86, and production data 88. During a training period, as described hereinbelow, processor 70 first executes data extraction application 78 that collects, from network 24, data packets 80 transmitted between in the network, and generates training data 82 from events in the collected data packets. Upon generating training data 82, processor 70 can execute model generation application 84 that analyzes the training data to learn a model 86. Collecting data packets from network 24 and processing the collected data packets to extract information is described, for example, in U.S. Patent Application 2014/0165207 to Engel et al., whose disclosure is incorporated herein by reference.

During a subsequent production period, as explained hereinbelow, data extraction application 78 collects additional data packets 80, generates production data 88 comprising production users 92 and respective events 90. In embodiments of the present invention, each event 90 comprise an instance when a given production user 92 or a given training user 26 accesses a resource (e.g. a given server 30). In operation, model 86 is configured to classify events 90 performed by a given production user 92 as either "safe" or "suspicious".

In the configuration shown in FIG. 2, Training data 82 comprises a set of records 94 and a corresponding label 96 for each of the records. In some embodiments, as shown in FIG. 2, model 86 comprises a set of features 98 and a corresponding weight 100 for each of the features. Once the problem is reduced to a supervised learning problem, any supervised learning algorithm can be applied in order to fit the data. Examples of such algorithms are decision trees, random frost, Bayesian methods, neural networks, etc. Records 94 and features are described in the description referencing FIG. 3 hereinbelow.

In the configuration shown in FIG. 2, anomaly detection system 22 comprises a probe 102 that collects information on data transmitted over network 24. While the example in FIG. 2 shows probe 102 as a module of anomaly detection system 22, the probe may be implemented as either a standalone device coupled to network 24 or as a module in another device coupled to the network. Using probe 102 to collect data packets from network and processing the collected data packets to extract information is described, for example, in U.S. Patent Application 2014/0165207 to Engel et al. and U.S. Patent Application 2015/0358344 to Mumcuoglu et al., whose disclosures are incorporated herein by reference.

Although anomaly detection system 22 is shown and described here for the sake of simplicity as a single, standalone unit, in practice the functions of the anomaly detection system may be integrated with other software-based functions in a single given server 30 and/or distributed over a group of servers 30 (or one or more workstations 28). In particular, anomaly detection system 22 may be integrated in a given server 30 that also monitors and investigates other types of security threats in computing facility 20. Such a server may also, for example, perform the anomaly detection functions described in the above-mentioned U.S. Patent Application 2014/0165207 and/or the forensic functions described in the above-mentioned U.S. Patent Application 2015/0358344. In some embodiments, anomaly detection system 22 may be deployed in computing facility 20 as one or more virtual machines.

Processor 70 comprises a general-purpose central processing unit (CPU) or special-purpose embedded processors, which are programmed in software or firmware to carry out the functions described herein. This software may be downloaded to the computer in electronic form, over a network, for example. Additionally or alternatively, the software may be stored on tangible, non-transitory computer-readable media, such as optical, magnetic, or electronic memory media. Further additionally or alternatively, at least some of the functions of processor 70 may be carried out by hard-wired or programmable digital logic circuits.

Figure 3:
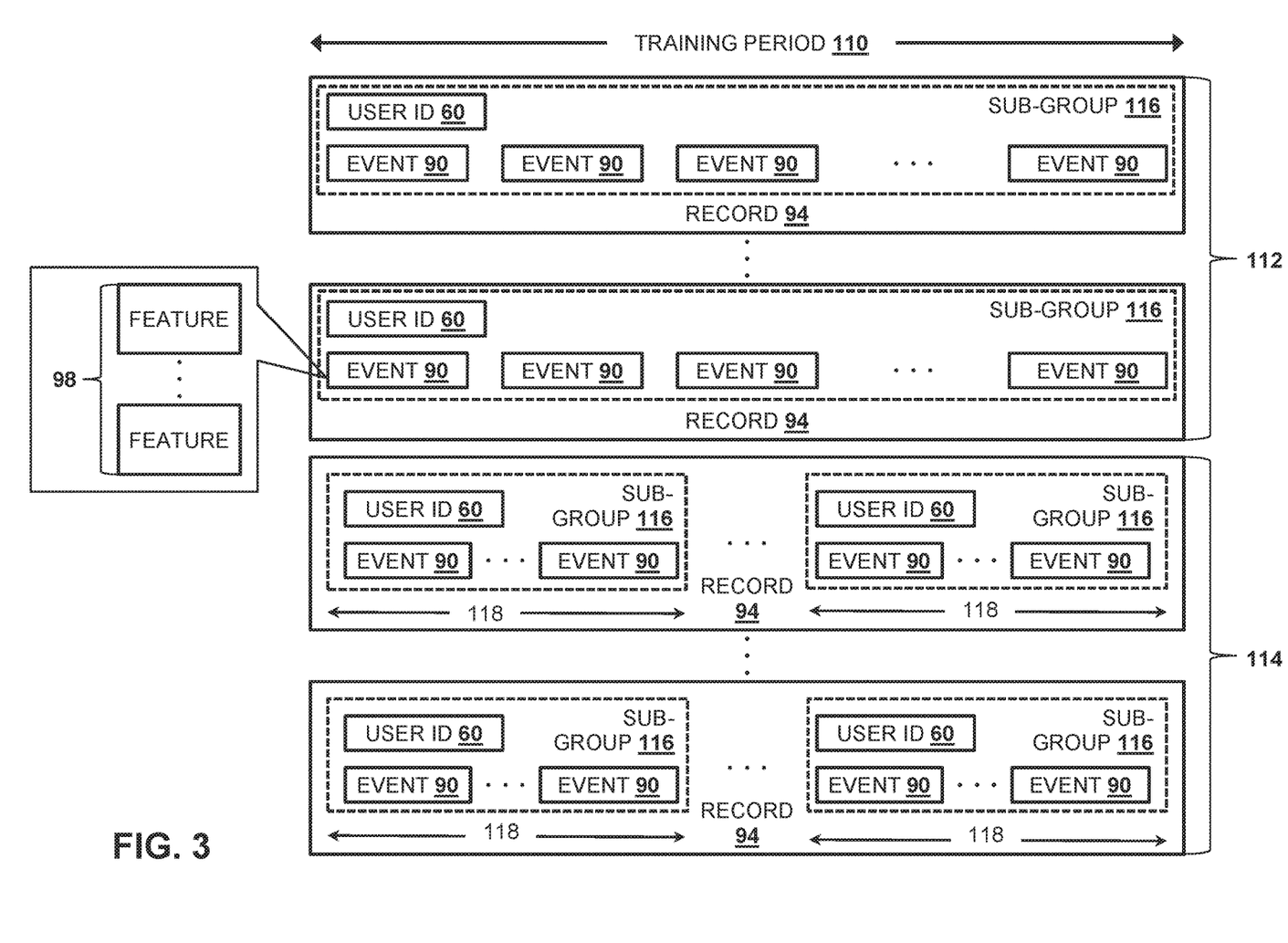
FIG. 3 is a block diagram showing data components of training data used, by the anomaly detection system, to train a model for detecting changes in use of user credentials, in accordance with an embodiment of the present invention.

FIG. 3 is a block diagram showing data components of training data 82 that data extraction application 78 collects during a training period 110, in accordance with an embodiment of the present invention. Training data 82 comprises a first set 112 of records 94 and a second set 114 of the records. Each of the records in the first set comprises a plurality of events 90 for a single training user 26, and each of the records in the second set comprises multiple training users 26, and respective pluralities of events 90 for each of the training users.

To create the first set of records 94, processor 70 extracts the respective pluralities of events 90 for each training user 26 during respective the training period, stores each corresponding user ID 60 and the respective events to respective sub-groups 116, and stores each of the subgroup to a separate record 94. To create the second set of records, processor 70 extracts the respective pluralities of events 90 for each training user 26 during respective sub-periods 118 of training period 110, stores each corresponding user ID 60 and the respective events (i.e., for the respective sub-periods) to respective sub-groups 116, and stores a plurality of the sub-groups to a separate record 94, as described in the description referencing FIG. 4 hereinbelow. The sub-periods in the second set of the training period can either be adjacent to each other, overlapping each other or non-adjacent to each other.

Each feature 98 comprises a property for one or more given event (i.e., a feature may comprise a number of events). Examples of features include, but are not limited to, an identity of a given server 30 that is accessed, a date of the access, a time of the access, a security level of the given server, and a file and/or directory accessed on the given server.

Suspicious Behavior Modeling

Figure 4:
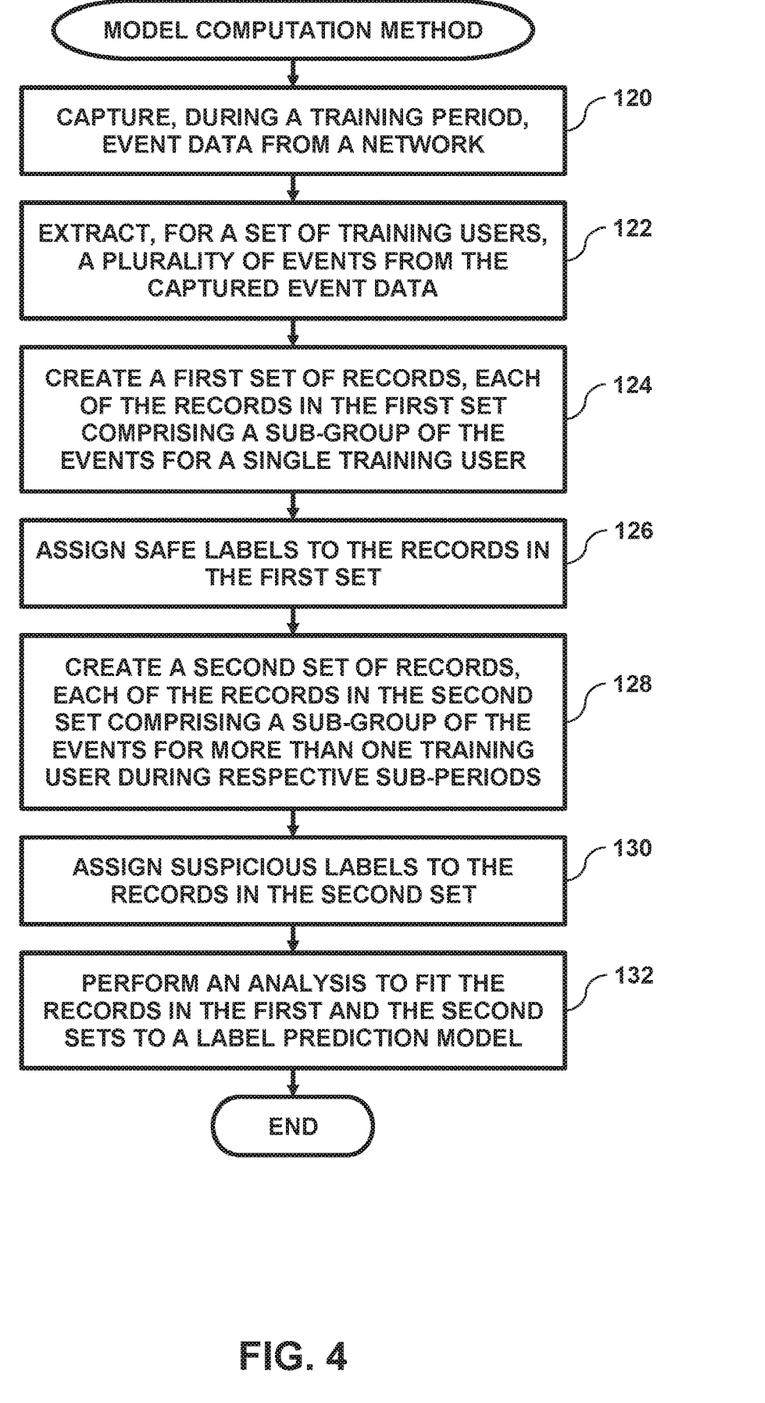
FIG. 4 is a flow diagram that schematically illustrates a method for computing the model, in accordance with an embodiment of the present invention.

FIG. 4 is a flow diagram that schematically illustrates a method for computing model 86, in accordance with an embodiment of the present invention. The intuition behind the method described in the flow diagram includes (a) the more stable the user's history, the more suspected the change, and (b) bigger changes indicate higher suspicions.

In a capture step 120, processor 70 captures data from network 24 during training period 110. In one embodiment, the captured data comprises data packets 80 collected directly from network 24 using embodiments described in the above-mentioned U.S. Patent Application 2014/0165207. In an alternative embodiment, processor 70 can collect the data from server logs 42.

In a feature extraction step 122, processor 70 extracts and aggregates, from the collected data, respective pluralities of events 90 for a set of training users 26. As described supra, each event 90 comprises an instance of a given training user accessing a resource such as given server 30. In embodiments where the captured data comprises data packets 80, a given training user 26 logs into a given workstation 28, and processor 70 extracts the events from the data packets transmitted between the given workstation and server(s) 30.

In a first creation step 124, processor 70 creates, from the respective pluralities of events 90, first set 112 of records 94, each of the records in the first set comprising a given training user 26, a given sub-group 116 of events 90 comprising the respective plurality of the events for the given training user, and features 98 for each of the events in the given sub-group. In a first classification step 126, processor 70 labels all the records in first set 112 as safe.

In a second creation step 128, processor 70 creates, from the respective pluralities of events 90, second set 114 of the records, each of the records in the second set comprising multiple training users 26, and for each of the multiple training users, respective sub-groups 116 during respective sub-periods 118. In a second classification step 130, processor 70 labels all the records in second set 114 as suspicious.

In some embodiments, as described in Appendix 1 hereinbelow, each record 94 in second set 114 comprises a paired data set, wherein each record 94 in the second set comprises first events 90 for a first given training user 26 that were captured during a first sub-period 118, and second events 90 for a second given training user 26 that were captured during a second sub-period 118 that follows the first sub-period. The second sub-period can either (a) overlap the first sub-period, (b) immediately follow (and is therefore adjacent to) the first sub-period, or (c) follow the first sub-period after a delay (i.e., there is a gap between the end of the first sub-period and the beginning of the second sub-period).

Finally, in an analysis step 132, processor 70 executes model generation application 84 (e.g., RapidMiner™) that performs an analysis to fit model 86 to the first and the second sets of records, and the method ends. In some embodiments, model 86 comprises features 98 and respective weights 100, and fitting the model to the first and second sets of records comprises processor 70 computing the respective weights for the features.

For example, if records 94 comprise a paired dataset (as described in Appendix 1 hereinbelow), then processor fits model 86 to the paired dataset. As described supra, model 86 receives a sequence of events 90 (and respective features 98) as an input, and labels (i.e., the concept to predict) for each sequence of events as either safe or suspicious. In some embodiments, model 86 comprises a set of features 98 and respective weights 100 for the features. Model 86 typically comprises an output from machine learning algorithm such as a regression analysis, a support vector machine (SVM), a decision tree, or a neural network.

Once model 86 is defined, processor 70 can, as described in the description referencing FIG. 5 hereinbelow, use the model to filter subsequent data (also known as production data) transmitted on network 24 (e.g., data packets 80 or data in logs 42) to identify (i.e., in the filtered data) sequences of events that the model classifies as suspicious. The filtered data comprises events 90 where production users 92 access resources 30. If the model classifies a given sequence of events as suspicious, processor 70 can generate an alert (e.g., on user interface device 76) for the production user associated with the given sequence of events.

Figure 5:
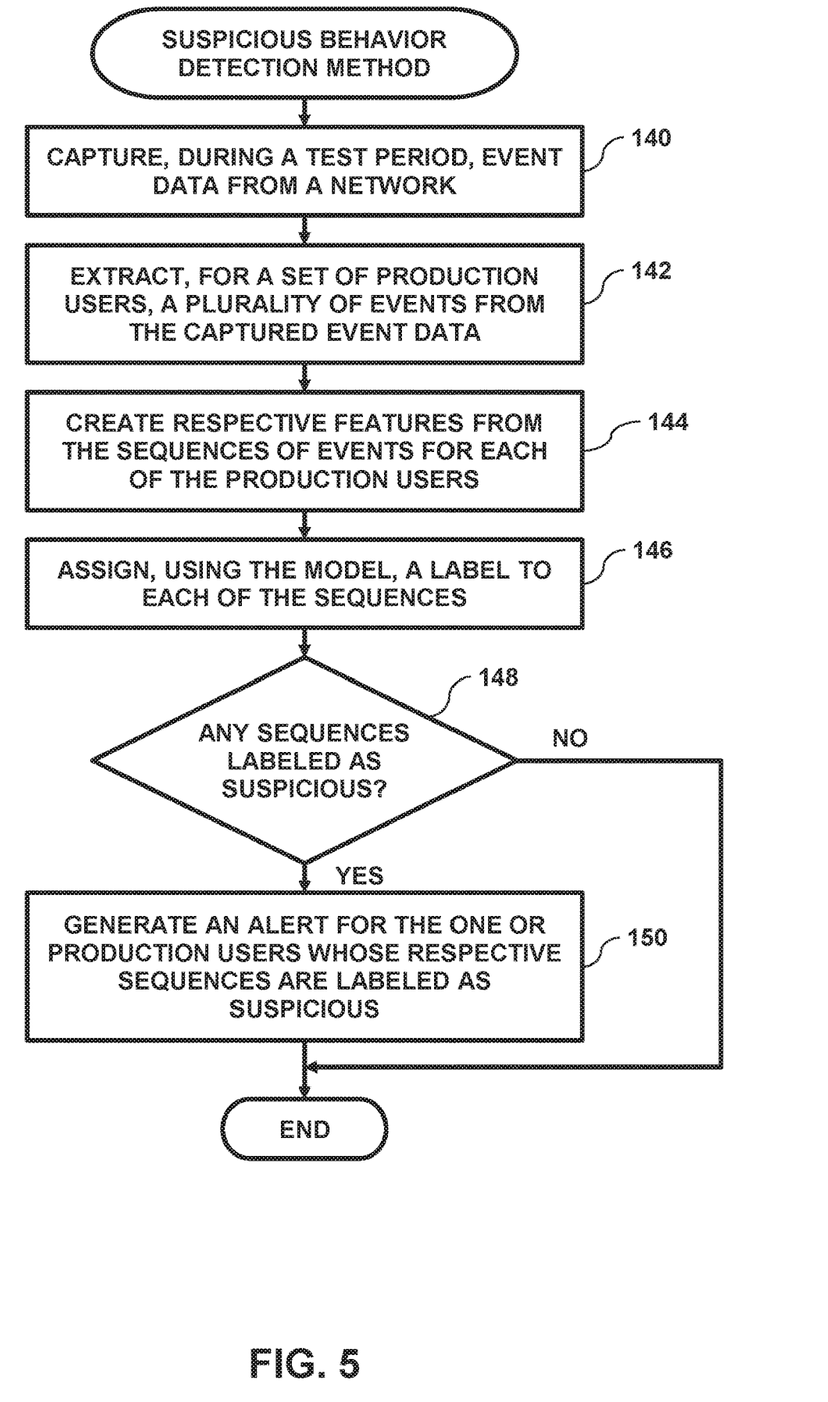
FIG. 5 is a flow diagram that schematically illustrates a method using the model to detect changes in the use of user credentials, in accordance with an embodiment of the present invention.

FIG. 5 is a flow diagram that schematically illustrates a method for using model 86 to identify changes in use of credentials 58 of a given production user 92, in accordance with an embodiment of the present invention. Similar to steps 120 and 122 described supra, processor 70 captures data from network 24 in a capture step 140, and extracts, for a set of production users 92, a plurality of events 90 from the captured data in an extraction step 142.

In a structuring step 144, processor 70 creates respective features from the sequences of events 90 for each production user 92, and in a labeling step 146, the system processor executes model 86 to assign respective labels 96 to the sequences. As described supra, each of the sequences also comprises one or more features 98 for each event 90.

In a comparison step 148, if processor 70 detects that any of the sequences are labeled as suspicious, then the processor generates an alert for the production users associated with the detected sequences in an alert step 150, and the method ends. To generate the alert processor 70 can perform operations such as conveying the alert to user interface device 76 or sending a message (e.g., an email or an SMS) to a system administrator.

Returning to step 148, if processor 70 does not detect any suspicious labels, then the method ends.

Appendix 1: Creating the Model

Prior to creating model 86, an analysis is typically needed to identify data that can be used to create the model, and what type of operations can be used to create the model. Embodiments of the present invention use resources (i.e., servers 30), and a sequence of events comprising training users 26 accessing the resources. Model generation application 84 receives a list of events 90, such as Alice accessing resource A at time T1, accessing resource B at time T2, etc. This information is typically available for all training users 26. In some embodiments additional information (e.g., Alice is an administrator, Resource A belongs to accounting) is available to model generation application 84.

Therefore, the input comprises:
A dataset of sequences of events per training user 26, S.
A split time, D.

Model generation application 84 builds and uses a model M (i.e., model 86) that will predict for every user 26 in S whether the user changed its behavior after time D.

One important characteristic of the data used in the analysis is that it lacks a concept (e.g., a medical condition of a person) that can be used in defining the goal of the prediction. If there is a concept, then supervised learning algorithms can be applied to build model 86. Additionally, having a concept enables looking for rules that differentiate between groups. The results of predictions can then be compared to the actual labels to determined how well do the model performs.

Typically, there are no concepts available for identifying changes in use of user credentials 58. First, the concept of behavior change is typically not well defined. For example, it may not be clear what is the minimal magnitude (i.e., of events for a given training user 26) to be considered a change. While this can be solved by human labeling, such labeling is very time consuming which means that only a small number of samples will be able to be processed. The "unclear" concept is still a problem even with human labeling, which may result in mistakes, disagreements, or just "I don't know".

Classical approaches that are typically used to create model 86 include sequence analysis, unsupervised learning and semi-supervised learning. Although the basic framing of the problem identifying changes in use of user credentials 58 is of sequence, the techniques used in this area are used for different goals. Typical sequence algorithms work on a sequence of temperatures and try to predict the weather tomorrow, and are therefore not concerned with the question of whether the weather today is very different from the weather in the previous week.

Unsupervised learning does not try to predict a concept, but rather models a dataset. Some of the unsupervised models can assign a probability to an event. One can use such a model in order to detect rare events (which can also be done using anomaly detection methods). One disadvantage of unsupervised learning is that the rareness of a given event 90 is not necessarily related to misuse of credentials 58 maliciousness. A given training user 26 that used to access many resources such as servers 30 and now accesses only one may be rare behavior, but probably does not indicates an attack.

Another problem is the inability to measure the prediction performance and especially false negatives. A high rate of attack identification (recall) is an important feature of the detector, and it is hard to improve the detector without being able to measure its accuracy with regard to false negatives.

Semi-supervised learning uses some samples with labels 96, but mostly uses samples that are not labeled. Such a data set can be reached by manually labeling some of the samples. The labeled samples enable using supervised learning algorithms. Some methods also enable labeling other samples based on existing labeled data (e.g., assuming close samples have the same label) and further increase the labeled data set. Anyway, the size of the labeled dataset tends to be small, making fitting hard, restricted to small models in order to avoid over-fitting, and performance estimations are therefore inaccurate.

Embodiments of the present invention solve the problem by taking an existing dataset of pairs of sequences and using the pairs of sequences to build a supervised dataset of a concept that is close to the concept that we actually wish to predict. When using pairs of sequences (also known as "paired datasets"), records 94 in second set 114 of records 94 comprise two subgroups 116 whose respective sub-periods 118 are typically adjacent (i.e., sequential).

Given a new dataset, supervised learning algorithms can be applied to produce model 86. The model on the new dataset can be evaluated in order to know how well it performs. The model on the original dataset can be further evaluated to verify that the new concept is close to the actual concept and that the model can accurately predict user behavior changes.

The following paragraphs describe using a pairs dataset generation algorithm for defining model 86. The input to the pairs dataset algorithm comprises:

A dataset of sequences of events per training user 26, S (wherein the given training user is defined by the given user's credentials 58 in computing facility 20 (i.e., a protected system).

A split time, D.

Multiple negative cases per user, R. The default is R=1 unless a special domain requires a different value. For R=1, a balanced dataset with a positive and a negative sample for each user can be obtained. For higher values of R, each user 26 can be concatenated with additional users 26. This can lead to the advantage of a larger dataset and the disadvantage of being imbalanced with respect to the concept.

Performing the pairs data set generation algorithm comprises the following steps:

For each of the series x in S, add x to P with concept False.
For each of the series x in S:
    For 1 to R times:
        Select a series y from S, x< >y (so x and y are different).
        Create a new series named x_y made of events of x before D and events of y after D.
        Add x_y to P with concept True.
Return P.

The output of the pairs data set generation algorithm comprises a dataset of sequence, where each sequence has a concept "Is different source?" P (meaning, is the behavior represented by the sequence due to a single actor, or are the later events generated by a different actor with the same user credentials).

For example, given the following dataset S:

| User 26 | Time | Resource 30 |
|---|---|---|
| Alice | 8:00 | Marketing1 |
| Bob | 8:10 | Accounting3 |
| Alice | 8:30 | Marketing4 |
| Alice | 9:00 | Marketing2 |
| Carol | 9:15 | Marketing1 |
| Bob | 9:15 | Accounting1 |
| Carol | 10:00 | Marketing2 |
| Alice | 10:10 | Marketing2 |
| Bob | 10:30 | Accounting2 |

Also, suppose that the above algorithm is run with split time D=10:00 and negative cases per user R=1. Therefore the following sequence combinations can be generated:

(Alice before D Access Sequence)+(Alice after D)=Same Source.
(Alice January before D Sequence)+(Bob after D)=Different Source.

Upon building the sequence combinations, a dataset P can be built as follows:

First each of the original series are used as an example of the same source:

| User | Time | Resource | Is different source? |
|---|---|---|---|
| Alice | 8:00 | Marketing1 | False |
| Alice | 8:30 | Marketing4 | False |
| Alice | 9:00 | Marketing2 | False |
| Alice | 10:10 | Marketing2 | False |
| Bob | 8:10 | Accounting3 | False |
| Bob | 9:15 | Accounting1 | False |
| Bob | 10:30 | Accounting2 | False |
| Carol | 9:15 | Marketing1 | False |
| Carol | 10:00 | Marketing2 | False |

Alice's activity before 10:00 concatenated with Bob's activity after 10:00 (including) results in:

| User | Time | Resource | Is different source? |
|---|---|---|---|
| Alice_Bob | 8:00 | Marketing1 | True |
| Alice_Bob | 8:30 | Marketing4 | True |
| Alice_Bob | 9:00 | Marketing2 | True |
| Alice_Bob | 10:30 | Accounting2 | True |

Extending Bob's activity using Carol, and Carol's activity using Alice results in:

| User | Time | Resource | Is different source? |
|---|---|---|---|
| Bob_Carol | 8:10 | Accounting3 | True |
| Bob_Carol | 9:15 | Accounting1 | True |
| Bob_Carol | 10:00 | Marketing2 | True |
| Carol_Alice | 9:15 | Marketing1 | True |
| Carol_Alice | 10:00 | Marketing2 | True |
| Carol_Alice | 10:10 | Marketing2 | True |

So at the end the data set P will look like the following table (typically before feature extraction), since the concept should refer to a sequence, not to each event.

| User | Time | Resource | Is different source? |
|---|---|---|---|
| Alice | 8:00 | Marketing1 | False |
| Alice | 8:30 | Marketing4 | False |
| Alice | 9:00 | Marketing2 | False |
| Alice | 10:10 | Marketing2 | False |
| Bob | 8:10 | Accounting3 | False |
| Bob | 9:15 | Accounting1 | False |
| Bob | 10:30 | Accounting2 | False |
| Carol | 9:15 | Marketing1 | False |
| Carol | 10:00 | Marketing2 | False |
| Alice_Bob | 8:00 | Marketing1 | True |
| Alice_Bob | 8:30 | Marketing4 | True |
| Alice_Bob | 9:00 | Marketing2 | True |
| Alice_Bob | 10:30 | Accounting2 | True |
| Bob_Carol | 8:10 | Accounting3 | True |
| Bob_Carol | 9:15 | Accounting1 | True |
| Bob_Carol | 10:00 | Marketing2 | True |
| Carol_Alice | 9:15 | Marketing1 | True |
| Carol_Alice | 10:00 | Marketing2 | True |
| Carol_Alice | 10:10 | Marketing2 | True |

One possible option to predict a change is to extract features 98 from the series and build a model M based upon them. In other words, the paired dataset can be used to build a same series model. Examples of such features 98 can be a number resources accessed before D, a number of resources accessed after D, and a number of resources accessed for the first time after D.

Extracting these features from P in our running example will lead to a table:

| User | Number resources accessed before D | Number of resources accessed after D | Number of resources accessed for the first time after D | Is different source? |
|---|---|---|---|---|
| Alice | 3 | 1 | 0 | False |
| Bob | 2 | 1 | 1 | False |
| Carol | 1 | 1 | 1 | False |
| Alice_Bob | 3 | 1 | 1 | True |
| Bob_Carol | 2 | 1 | 1 | True |
| Carol_Alice | 1 | 2 | 2 | True |

Given these features a supervised learning algorithm (e.g., an SVM, a decision tree, or a neural network) can be used in order to build model 86 for predicting whether the user's behavior has changed. A simple such model might be predict a change if the number of resources 30 accessed for the first time after D is higher than 1.

Next, any users 26 that changed their behavior at some point in time D2 can be identified by using the change model in order to predict the change. By taking the series of the users, D2 can be used as the split time and features 98 can be extracted. Model M can then be run on the users. For users 26 which model M predicts that the actions were not performed by the same source a behavior change can be predicted.

Note that the process described supra comprises a method for building model(s) 86. While the described process supra helps in building M and evaluating it, the model is the output of the method, not the method itself.

Now that there is a labeled dataset, all the regular performance measures (e.g., accuracy, recall, etc.) can be evaluated. The false negatives can be investigated (note that this cannot be done without labels) to identify what went wrong with their) classification. Results of this investigation can be used to further improve M.

M can then be analyzed to evaluate the hit rate and the precision on the original dataset. The model "number of resources accessed for the first time after D is higher than 1" will have precision of 100% but a recall of 33% on P. Samples of Alice_Bob and Bob_Carol can then be used in order to improve M's recall.

Another question of interest is how close the simulated concept is to the original one. One can get a result by manually labeling the simulated samples with respect to behavior change and check their respective agreement levels. If there is high agreement and the model predicts the simulated concept well, the model can typically accurately predict the change as well.

The following summarizes the method for creating M:
Input
    A dataset of sequences of events per user, S.
    A split time, D.
    A feature extraction algorithm (FE), wherein the method is indifferent to the choice of features and how they are extracted.
    A supervised learning algorithm C, wherein the method is indifferent to the algorithm and resulting classifier.
Output
    A model M that can predict for every user in S whether the user changed its behavior after time D.
Steps
    Construct a dataset P using "The pairs data set generation algorithm".
    Use FE to extract features $F_p$ from P given D.
    Use C to build a model M on F.
    Use FE to extract features $F_s$ from S.
    Return the predictions of M on $F_s$.

Advantages of using the method described supra to build model M include:
There is typically plenty of labeled data (i.e., that can make splits at different dates, and can choose the users to match).
Supervised learning algorithms that fit the needs of the analysis can be applied.
It can be determines exactly how well the algorithm predicts on the simulated concept.
The number false negatives (and where they occur) can be determined
    Note that this is not feasible with manual labeling.
    Note that this is important for improving the model.
The precision of the model on the real concept can be calculated.
The similarity between the syntactic concept behind the model and the real concept that we wish to evaluate can be estimated.

Appendix 2: Sample Code

The following is sample Python code for implementing the pairs dataset construction:

```
from pandas import DataFrame, concat
import random
def build_pairs_dataset(user_sequesce_df, split_time,
            negative_cases_per_user=1):
    pairs_dataset = user_sequesce_df.copy( )
    pairs_dataset['Is_Different_Source'] = False
    keys = list(set(user_sequesce_df['user_name'].tolist( )))
    positive_df = DataFrame(columns=user_sequesce_df.columns)
    for base_key in keys:
        other_keys = [x for x in keys if x <> base_key]
        for i in range(negative_cases_per_user):
            extend_key = random.choice(other_keys)
            new_seq = DataFrame(columns=user_sequesce_df.columns)
            new_seq = pairs_dataset[(pairs_dataset.user_name == base_key) &
                    (pairs_dataset.request_time         <
split_time)].copy( )
                new_seq = concat([new_seq,
                        pairs_dataset[(pairs_dataset.user_name         ==
extend_key) &
                        (pairs_dataset.request_time         >=
split_time)].copy( )])
```

-continued

```
        new_seq['user_name'] = base_key + '_' + extend_key
        positive_df = concat([positive_df, new_seq])
    positive_df['Is_Different_Source'] = True
    pairs_dataset = concat([pairs_dataset, positive_df])
    return pairs_dataset
```

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   extracting, from initial data transmitted on a data network comprising a set of resources accessed by a set of training users, a plurality of events, each of the events comprising a given training user accessing a given resource at a given time;
   creating a set of first records, each first record comprising a sub-group of the extracted events of a single training user;
   creating a set of second records, each second record including events of at least two different training users;
   assigning safe labels to the first records suspicious labels to the second records;
   performing, by a processor, an analysis to fit, to the first and the second records and their respective labels, a model for predicting the label for a given record;
   filtering, using the model, subsequent data transmitted on the data network to identify, in the subsequent data, sequences of events predicted to be labeled suspicious by the model; and
   upon detecting a given sequence of events predicted as suspicious by the model, generating an alert,
   wherein filtering the subsequent data comprises extracting, from the data transmitted on the data network between a set of resources accessed by a set of production users, a plurality of additional events, and creating respective sequences of the additional events for the production users,
   wherein using the model comprises applying the model to the sequences of the additional events, and
   wherein when the model classifies a given sequence of events as suspicious, generating an alert or sending a message on a user interface device for one production user associated with the given sequence of events.

2. The method according to claim 1, wherein the analysis comprises a machine learning algorithm.

3. The method according to claim 1, wherein a given resource comprises a server.

4. The method according to claim 1, wherein the data network comprises a workstation comprising a log, wherein a given training user is logged into the workstation, wherein the log comprising actions performed by the resource for a given training user, and wherein the data comprises the log.

5. The method according to claim 1, wherein the data network comprises a workstation, wherein a given training user is logged into the workstation, and where in the extracted data comprises data packets transmitted between the workstation and the resources.

6. The method according to claim 1, wherein creating the second records comprises creating a record including the events of a first training user at times up to a specified time and the events of a second user of times subsequent to the specified time.

7. An apparatus, comprising:
   a memory; and
   a hardware processor configured:
   to extract, from initial data transmitted on a data network comprising a set of resources accessed by a set of training users, a plurality of events, each of the events comprising a given training user accessing a given resource at a given time,
   to create a set of first records, each first record comprising a sub-group of the extracted events of a single training user;
   to create a set of second records, each second record including events of at least two different training users;
   to assign safe labels to the first records suspicious labels to the second records;
   to perform an analysis to fit, to the first and the second records and their respective labels, a model for predicting the label for a given record,
   to filter, using the model, subsequent data transmitted on the data network to identify, in the subsequent data, sequences of events predicted to be labeled suspicious by the model, and
   upon detecting a given sequence of events predicted as suspicious by the model, to generate an alert,
   wherein the processor is configured to filter the subsequent data by extracting, from the data transmitted on the data network between a set of resources accessed by a set of production users, a plurality of additional events, and creating respective sequences of the additional events for the production users,
   wherein the processor is configured to use the model by applying the model to the sequences of the additional events, and
   wherein when the model classifies a given sequence of events as suspicious, the processor generates an alert or sends a message on a user interface device for one production user associated with the given sequence of events.

8. The apparatus according to claim 7, wherein the analysis comprises a machine learning algorithm.

9. The apparatus according to claim 7, wherein a given resource comprises a server.

10. The apparatus according to claim 7, wherein the data network comprises a workstation comprising a log, wherein a given training user is logged into the workstation, wherein the log comprising actions performed by the server for a given training user, and wherein the data comprises the log.

11. The apparatus according to claim 7, wherein the data network comprises a workstation, wherein a given training user is logged into the workstation, and where in the extracted data comprises data packets transmitted between the workstation and the resources.

12. A computer software product, the product comprising a non-transitory computer-readable medium, in which program instructions are stored, which instructions, when read by a computer, cause the computer:

- to extract, from initial data transmitted on a data network comprising a set of resources accessed by a set of training users, a plurality of events, each of the events comprising a given training user accessing a given resource at a given time;
- to create a set of first records, each first record comprising a sub-group of the extracted events of a single training user;
- to create a set of second records, each second record including events of at least two different training users;
- to assign safe labels to the first records suspicious labels to the second records;
- to perform an analysis to fit, to the first and the second records and their respective labels, a model for predicting the label for a given record;
- to filter, using the model, subsequent data transmitted on the data network to identify, in the subsequent data, sequences of events predicted to be labeled suspicious by the model; and
- upon detecting a given sequence of events predicted as suspicious by the model, to generate an alert, wherein the filtering of the subsequent data includes extracting, from the data transmitted on the data network between a set of resources accessed by a set of production users, a plurality of additional events, and creating respective sequences of the additional events for the production users, wherein the instructions cause the computer to use the model by applying the model to the sequences of the additional events, and wherein when the model classifies a given sequence of events as suspicious, the computer generates an alert or sends a message on a user interface device for one production user associated with the given sequence of events.

* * * * *